US009451761B2

(12) United States Patent
Messina (10) Patent No.: US 9,451,761 B2
(45) Date of Patent: Sep. 27, 2016

(54) PEST MANAGEMENT SYSTEM (76) Inventor: James D. Messina, Washington, NJ (US)

(*) Notice: Subject to any disclaimer, the term of this patent is extended or adjusted under 35 U.S.C. 154(b) by 341 days.

(21) Appl. No.: 13/981,413

(22) PCT Filed: Jan. 24, 2012

(86) PCT No.: PCT/US2012/022357
§ 371 (c)(1),
(2), (4) Date: Oct. 7, 2013

(87) PCT Pub. No.: WO2012/103086
PCT Pub. Date: Aug. 2, 2012

(65) Prior Publication Data
US 2014/0059920 A1 Mar. 6, 2014

Related U.S. Application Data (60) Provisional application No. 61/437,042, filed on Jan. 28, 2011, provisional application No. 61/511,599, filed on Jul. 26, 2011.

(30) Foreign Application Priority Data

Apr. 11, 2011 (WO) .................. PCT/US2011/31901

(51) Int. Cl.
A01M 1/20 (2006.01)
A01M 29/00 (2011.01)
(Continued)

(52) U.S. Cl.
CPC .............. A01M 25/002 (2013.01); A01G 9/04 (2013.01); A01M 1/2005 (2013.01); A01M 1/2011 (2013.01); A01M 25/004 (2013.01); A01M 29/00 (2013.01); A01M 29/12 (2013.01)

(58) Field of Classification Search
CPC ...... A01M 29/00; A01M 29/12; A01M 1/20; A01M 1/2005; A01M 1/2011; A01M 1/10; A01M 1/103; A01G 9/04; A01G 9/042; A01G 9/02; A01G 9/021
USPC ........ 43/131, 121, 107, 132.1, 124; 47/65.5, 47/71, 66.6; 206/423
See application file for complete search history.

(56) References Cited

U.S. PATENT DOCUMENTS 23,422 A * 3/1859 Blakeman ........................ 43/131
56,008 A * 7/1866 Clarke ................. A47C 19/022
5/279.1

(Continued)

FOREIGN PATENT DOCUMENTS

DE 19751385 C1 * 10/1998 ............ A01M 29/00
DE 19812530 A1 * 9/1999 ............ A01M 29/00

(Continued)

OTHER PUBLICATIONS

International Preliminary Report on Patentability for International Application No. PCT/US2012/022357, dated Aug. 8, 2013.

(Continued)

Primary Examiner — Darren W Ark
(74) Attorney, Agent, or Firm — DT Ward, PC; Donna T. Ward; Christopher P. Sullivan (57) ABSTRACT The present invention provides compositions and methods for the control and management of wildlife populations (including domesticated animals) and pests. Specifically provided are pest control systems incorporating the use of repellent or attractant formulations.

6 Claims, 12 Drawing Sheets (51) Int. Cl.
   *A01M 29/12* (2011.01)
   *A01M 29/34* (2011.01)
   *A01M 25/00* (2006.01)
   *A01G 9/04* (2006.01)

(56) References Cited

U.S. PATENT DOCUMENTS

| | | | | |
|---|---|---|---|---|
| 223,321 A * | 1/1880 | Denton | A01M 29/34 | 43/109 |
| 519,811 A * | 5/1894 | Gerard | A47C 19/024 | 43/109 |
| 661,411 A * | 11/1900 | Lonitz | | 47/71 |
| 898,852 A * | 9/1908 | Duggan | A01M 29/34 | 43/109 |
| 1,068,258 A * | 7/1913 | McCombs | A01M 29/34 | 43/109 |
| 1,242,680 A * | 10/1917 | Goedeke | A01M 29/34 | 43/109 |
| 1,248,283 A * | 11/1917 | Derck | A01M 29/34 | 43/109 |
| 1,305,547 A * | 6/1919 | Joseph | B60B 33/00 | 43/109 |
| 1,305,553 A * | 6/1919 | Kruse | A01M 29/34 | 43/131 |
| 1,325,316 A * | 12/1919 | Diss | B60B 33/0002 | 43/109 |
| 1,390,734 A * | 9/1921 | Stevens | A01M 29/34 | 43/109 |
| 1,402,998 A * | 1/1922 | Anderson | A47B 91/12 | 43/109 |
| 1,405,822 A * | 2/1922 | Erickson | A01M 29/34 | 43/109 |
| 1,581,410 A * | 4/1926 | Welsh | A01M 1/14 | 43/109 |
| 1,732,028 A * | 10/1929 | Reiner | A01M 1/2044 | 119/654 |
| 1,745,905 A * | 2/1930 | Oakman | A01M 29/34 | 43/109 |
| 1,780,408 A * | 11/1930 | Smith | A01M 1/2044 | 43/131 |
| 1,800,613 A * | 4/1931 | Farrell | A01M 29/34 | 43/109 |
| 1,856,200 A * | 5/1932 | Tippey | A01M 1/2005 | 43/131 |
| 1,900,199 A * | 3/1933 | Pickett | A01M 1/02 | 43/107 |
| 1,922,702 A * | 8/1933 | Kristman | A01M 1/2005 | 43/131 |
| 2,063,768 A * | 12/1936 | Staffel | A01M 1/2005 | 43/131 |
| 2,167,978 A * | 8/1939 | Jennerich | A01M 1/2005 | 43/121 |
| 2,255,360 A * | 9/1941 | Miller | A01M 1/2005 | 43/121 |
| 2,356,022 A * | 8/1944 | Wright | A01M 1/2011 | 43/131 |
| 2,435,317 A * | 2/1948 | McGrew | A01M 1/2005 | 43/121 |
| 2,547,687 A * | 4/1951 | Brody | A01M 1/2055 | 206/0.5 |
| 2,547,688 A * | 4/1951 | Brody | A01M 1/2022 | 239/57 |
| 2,550,602 A * | 4/1951 | Rothe | | 47/71 |
| 2,579,715 A * | 12/1951 | Wilson | A01M 1/2055 | 220/480 |
| 2,725,663 A * | 12/1955 | Mullen | A01M 25/004 | 43/131 |
| 2,734,769 A * | 2/1956 | Holz | A01M 1/2055 | 239/57 |
| 2,770,957 A * | 11/1956 | Bronson | | 47/71 |
| 2,944,364 A * | 7/1960 | Kelly | A01M 25/004 | 43/131 |
| 2,977,711 A * | 4/1961 | Starr | A01M 25/004 | 43/131 |
| 3,009,603 A | 11/1961 | Stockdale | | |
| 3,088,241 A * | 5/1963 | Shrojavacca | A01M 29/12 | 43/132.1 |
| 3,285,694 A * | 11/1966 | Marchi | A01M 1/2066 | 422/305 |
| 3,441,003 A * | 4/1969 | Lister | A01K 5/0114 | 43/121 |
| 3,488,879 A * | 1/1970 | Laughlin | A01M 25/004 | 43/131 |
| 3,704,539 A * | 12/1972 | Alvarez | A01M 1/2011 | 43/131 |
| 3,772,820 A * | 11/1973 | Bond | A01M 25/008 | 43/131 |
| 3,896,995 A * | 7/1975 | Lelicoff | A01M 1/2044 | 43/132.1 |
| 3,995,595 A * | 12/1976 | Williams | A01K 5/0142 | 43/131 |
| 4,308,690 A * | 1/1982 | Klein | | 47/79 |
| 4,315,382 A * | 2/1982 | Kay et al. | | 47/71 |
| 4,442,629 A * | 4/1984 | Anderson | | 47/71 |
| 4,481,733 A * | 11/1984 | Jacobs | | 47/71 |
| 4,563,836 A * | 1/1986 | Woodruff | A01M 1/2011 | 43/131 |
| 4,739,581 A * | 4/1988 | Jarvis | | 47/71 |
| 4,761,912 A * | 8/1988 | Dyer | A01M 25/008 | 43/131 |
| 4,802,302 A * | 2/1989 | Alnafissa | A01K 5/0142 | 43/121 |
| 4,803,954 A * | 2/1989 | Welch | A01K 5/0128 | 119/61.53 |
| 4,804,142 A * | 2/1989 | Riley | A01M 29/12 | 43/131 |
| 4,821,452 A | 4/1989 | Beckley | | |
| 4,837,969 A * | 6/1989 | Demarest | A01M 1/2005 | 43/131 |
| 4,953,506 A * | 9/1990 | Sanders | A01K 5/0142 | 119/61.53 |
| 5,148,626 A * | 9/1992 | Haake, Sr. | A01K 5/0142 | 43/132.1 |
| D342,352 S | 12/1993 | Embrey | | |
| 5,274,950 A * | 1/1994 | Roberts | A01M 1/245 | 43/131 |
| 5,357,709 A * | 10/1994 | Lin | A01M 1/2005 | 43/131 |
| 5,379,545 A * | 1/1995 | Gall | A01M 31/008 | 43/131 |
| 5,390,441 A * | 2/1995 | Pence | A01M 25/008 | 43/131 |
| 5,548,922 A * | 8/1996 | Wefler | A01M 1/2011 | 43/132.1 |
| 5,619,952 A * | 4/1997 | Walker | A01K 5/0142 | 119/61.53 |
| 5,638,638 A * | 6/1997 | Moskowitz | | 47/71 |
| 5,730,083 A * | 3/1998 | Walker | A01K 5/0142 | 83/699.41 |
| 5,737,870 A * | 4/1998 | Thind | A01M 1/026 | 43/132.1 |
| 5,802,761 A * | 9/1998 | Demarest | A01M 1/2011 | 43/132.1 |
| 5,881,671 A * | 3/1999 | Riedl | A01K 5/0142 | 43/109 |
| 5,953,854 A * | 9/1999 | Hyatt | A01M 1/026 | 43/131 |
| 5,960,585 A * | 10/1999 | Demarest | A01M 1/2011 | 43/131 |
| 5,983,558 A * | 11/1999 | Las | A01M 1/2005 | 43/131 |
| 5,996,531 A * | 12/1999 | Anderson | A01K 5/0142 | 43/109 |
| 6,065,428 A * | 5/2000 | Fronk | A01K 5/0142 | 119/61.53 |
| 6,134,832 A * | 10/2000 | Bokmiller | A01G 9/021 | 47/66.1 |
| 6,145,242 A * | 11/2000 | Simpson | A01M 1/2011 | 43/131 |
| 6,272,791 B1 * | 8/2001 | Pleasants | A01M 1/2011 | 43/131 |
| 6,372,240 B1 * | 4/2002 | Messina | A01N 65/00 | 424/405 |
| 6,378,242 B1 * | 4/2002 | Roberts | A01M 29/34 | |

(56) References Cited

U.S. PATENT DOCUMENTS

| | | | | |
|---|---|---|---|---|
| 6,383,508 | B1* | 5/2002 | Messina | A01N 65/00 43/132.1 424/405 |
| 6,401,384 | B1* | 6/2002 | Contadini | A01M 1/026 43/132.1 |
| 6,484,437 | B2* | 11/2002 | Roberts | A01M 29/34 43/131 |
| 6,505,433 | B2* | 1/2003 | Roberts | A01M 29/34 43/132.1 |
| 6,510,648 | B2* | 1/2003 | Roberts | A01M 29/34 43/132.1 |
| 6,510,653 | B1* | 1/2003 | Workum et al. | 47/65.5 |
| 6,513,280 | B2* | 2/2003 | Roberts | A01M 29/34 43/132.1 |
| 6,513,281 | B2* | 2/2003 | Roberts | A01M 29/34 43/132.1 |
| 6,594,948 | B1* | 7/2003 | Novack | A01M 1/2016 43/121 |
| D488,402 | S * | 4/2004 | Fan | D11/164 |
| 6,729,067 | B2* | 5/2004 | Lund | A01M 1/026 43/132.1 |
| 6,735,901 | B1* | 5/2004 | Bellehumeur | A01M 29/12 43/132.1 |
| 6,739,087 | B2* | 5/2004 | Weiser | A01M 25/008 43/121 |
| 6,766,615 | B2* | 7/2004 | Smead | 47/71 |
| 6,789,352 | B2* | 9/2004 | Price | A01M 1/2005 43/132.1 |
| 6,792,713 | B2* | 9/2004 | Snell | A01M 1/2005 43/131 |
| 6,796,082 | B1* | 9/2004 | Duston | A01M 1/2005 43/131 |
| 6,955,008 | B2* | 10/2005 | Rose | A01G 9/02 47/80 |
| 7,000,351 | B2* | 2/2006 | Baumann | 47/71 |
| 7,013,601 | B2* | 3/2006 | Liffers et al. | 47/67 |
| 7,043,873 | B2* | 5/2006 | Westphal | A01M 1/2005 43/132.1 |
| 7,204,054 | B2* | 4/2007 | Mayo et al. | 43/131 |
| 7,325,358 | B1* | 2/2008 | Chalupsky | A01M 29/12 43/131 |
| 7,380,370 | B2* | 6/2008 | Livingston | A01M 29/12 43/124 |
| 7,591,099 | B2* | 9/2009 | Lang | A01M 1/023 43/107 |
| 7,690,150 | B2* | 4/2010 | Orschulik | 47/71 |
| 7,793,920 | B2* | 9/2010 | Bauer | A01M 1/04 424/409 |
| 7,892,528 | B2* | 2/2011 | Siljander et al. | 424/84 |
| 8,336,254 | B2* | 12/2012 | Baumann | 47/71 |
| 8,402,690 | B2* | 3/2013 | Schneidmiller | A01M 1/103 43/121 |
| 8,490,324 | B2* | 7/2013 | Highet | A01M 25/004 43/131 |
| 8,745,917 | B2* | 6/2014 | Hui | A01M 1/103 43/121 |
| 8,793,930 | B2* | 8/2014 | Chilton | A01G 13/105 43/131 |
| 9,185,898 | B2* | 11/2015 | McIntyre | A01M 29/12 |
| 2002/0110576 | A1* | 8/2002 | Messina | A01N 65/00 424/411 |
| 2003/0145511 | A1* | 8/2003 | Finn et al. | 43/131 |
| 2005/0091920 | A1* | 5/2005 | Smead | 47/71 |
| 2005/0252074 | A1* | 11/2005 | Duston et al. | 43/131 |
| 2006/0163274 | A1* | 7/2006 | Chalupsky | A01M 29/12 222/23 |
| 2006/0168883 | A1* | 8/2006 | Brutsche et al. | 47/71 |
| 2008/0104882 | A1* | 5/2008 | Bernard et al. | 43/131 |
| 2009/0229180 | A1* | 9/2009 | Rich et al. | 47/71 |
| 2009/0241417 | A1* | 10/2009 | Smith | 47/65.5 |
| 2009/0258950 | A1 | 10/2009 | Knoblauch | |
| 2010/0074860 | A1 | 3/2010 | Kupfer et al. | |
| 2010/0199554 | A1* | 8/2010 | Smaal | 47/65.5 |
| 2011/0047860 | A1* | 3/2011 | Black et al. | 43/121 |
| 2011/0088310 | A1* | 4/2011 | Parker et al. | 43/131 |
| 2011/0177149 | A1* | 7/2011 | Messina | A01N 65/00 424/417 |
| 2011/0252695 | A1* | 10/2011 | Pryor | 43/131 |
| 2012/0066960 | A1* | 3/2012 | Pryor | 43/131 |
| 2013/0111801 | A1* | 5/2013 | White | A01K 5/0142 43/109 |
| 2013/0118071 | A1* | 5/2013 | VanWingerden | 47/65.5 |
| 2013/0156839 | A1* | 6/2013 | Messina | A01N 37/06 43/131 |
| 2014/0090294 | A1* | 4/2014 | VanWingerden | 47/65.5 |
| 2014/0165919 | A1* | 6/2014 | O'Connor | A01K 5/0142 119/51.01 |
| 2014/0314885 | A1* | 10/2014 | Messina, Sr. | A01N 65/00 424/745 |
| 2014/0352630 | A1* | 12/2014 | Messina | A01N 49/00 119/712 |
| 2014/0363527 | A1* | 12/2014 | Messina | A01N 37/06 424/731 |
| 2015/0173305 | A1* | 6/2015 | Kidder | A01G 9/02 |
| 2015/0342129 | A1* | 12/2015 | Boylan | A01G 9/042 47/65.5 |

FOREIGN PATENT DOCUMENTS

| | | | | |
|---|---|---|---|---|
| DE | 10139703 | A1 * | 2/2003 | A01M 29/00 |
| EP | 658306 | A1 * | 6/1995 | A01M 1/20 |
| EP | 724826 | | 8/1996 | |
| GB | 504011 | A * | 4/1939 | A01G 9/02 |
| GB | 2095965 | A * | 10/1982 | A01M 1/20 |
| GB | 2428362 | A * | 1/2007 | A01M 1/20 |
| GB | 2481261 | A * | 12/2011 | A01M 29/00 |
| JP | 02009806 | A * | 1/1990 | A01M 29/00 |
| JP | 09051751 | A * | 2/1997 | A01M 1/20 |
| JP | 10042708 | A * | 2/1998 | A01M 29/00 |
| JP | 11046592 | A * | 2/1999 | A01M 29/00 |
| JP | 11346626 | A * | 12/1999 | A01M 1/20 |
| JP | 2001112349 | A * | 4/2001 | A01G 9/04 |
| JP | 2002078438 | A * | 3/2002 | A01M 1/20 |
| JP | 2002171892 | A * | 6/2002 | A01M 29/00 |
| JP | 2002209499 | A * | 7/2002 | A01M 1/20 |
| JP | 2002223638 | A * | 8/2002 | A01M 29/00 |
| JP | 2002320437 | A * | 11/2002 | A01M 1/20 |
| JP | 2003038084 | A * | 2/2003 | A01M 29/00 |
| JP | 2004275155 | A * | 10/2004 | A01M 29/00 |
| JP | 2005065609 | A * | 3/2005 | A01G 9/04 |
| JP | 2009106249 | A * | 5/2009 | A01M 29/00 |
| JP | 2010220603 | A | 10/2010 | |
| JP | 2011083265 | A * | 4/2011 | A01M 29/00 |
| JP | 2011182766 | A | 9/2011 | |
| JP | 2011239723 | A * | 12/2011 | A01M 29/12 |
| NL | 1015373 | | 12/2001 | |
| WO | WO 9115951 | A1 * | 10/1991 | A01M 1/20 |
| WO | WO 9811775 | A1 * | 3/1998 | A01M 1/20 |
| WO | WO 2007073843 | A1 * | 7/2007 | A01G 9/04 |
| WO | 2010019141 | A1 | 2/2010 | |
| WO | WO2010019141 | | 2/2010 | |
| WO | 2011142918 | A1 | 11/2011 | |
| WO | 2012103086 | A1 | 8/2012 | |
| WO | 2013070441 | A1 | 5/2013 | |
| WO | 2013134169 | A1 | 9/2013 | |

OTHER PUBLICATIONS

International Search Report for PCT Application No. PCT/US2012/022357 dated Jun. 1, 2012.

* cited by examiner

PEST MANAGEMENT SYSTEM

CROSS REFERENCE TO RELATED APPLICATIONS

This application is a 35 U.S.C. §371 U.S. National Stage Entry of International Application No. PCT/US2012/022357 filed Jan. 24, 2012, which claims the benefit of priority of U.S. Provisional Application Ser. No.: 61,511,599 filed Jul. 26, 2011; U.S. Provisional Application Ser. No.: 61/437,042 filed Jan. 28, 2011; and PCT/US2011/031901 filed Apr. 11, 2011.

FIELD OF THE INVENTION

The invention relates to an animal and/or insect pest management system.

BACKGROUND OF THE INVENTION

The encroachment of human habitation on heretofore rural areas has exacerbated existing problems of pest control. Insect pests are also becoming more prevalent in suburban, urban and rural areas.

Synthetic and often toxic chemical control means have long been used to manage pest movement and populations. However, with increasing public awareness of health issues regarding the impact on humans and the environment exposed to such chemical compounds, much effort has been expended in the identification of more benign and natural control measures.

To this end, legislative steps have been taken to categorize certain natural compounds as safe for use and hence exempt from certain government regulations under the Federal Insecticide, Fungicide, and Rodenticide Act (FIFRA).

Despite the strong incentive to develop natural and safe pesticides and animal repellents, there remains a long-felt need for compositions that are as effective (or more effective) than the chemical toxins currently in use to mitigate the economic and health impact of pests on humans. Likewise, in conjunction with the need for better pesticides, is the need for better pest management systems. Such systems should not only effect proper pest management including pest attraction, repulsion and/or deterrence, they should also be well integrated into the environment. Integration of pest management systems is not simply a matter of aesthetic optimization but of environmental fit, safety and utility. The present invention solves these problems.

SUMMARY OF THE INVENTION

The present invention provides for a pest control management system or "pest management system" or "PMS" which are functional to control pest populations either by preventing ingress or egress or by attracting pests for containment and/or relocation as well as for extermination. In this system, a repellent (or attractant) formulation may be incorporated into, used with a device which resembles, is disguised as, or is already an integral part of its environment.

In one embodiment, the pest management system device resembles a saucer for planters. Other embodiments are devices that resemble plant pots, vases, door jams, wood molding for placement in corners, bottles, food containers, food items, books, deck of cards, rocks, logs, articles of clothing, and outdoor camping equipment. In a further embodiment, the formulations (attractants and/or repellents) used in conjunction with the present invention are used in outdoor settings and derive their disguise by being inserted or integrated into or onto a device of the invention placed in the particular environmental setting. For example, campers may carry the devices of the present invention with them and place samples, packets or containers of repellents/attractants under, inside or on the surface of the devices. In this embodiment, it is beneficial, but not necessary, that the packet material in which the attractant or repellent is held be biodegradable.

The repellent and/or attractant compositions useful in conjunction with the PMSs of the present invention include any of those of standard use in the art. It is of special interest to employ repellents and attractants which are generally accepted as safe (GRAS). Examples of such compositions are disclosed in, for example, commonly-owned International PCT filing PCT/US2011/031901 filed Apr. 27, 2011, the contents of which are incorporated herein by reference in their entirety.

BRIEF DESCRIPTION OF THE DRAWINGS

The foregoing and other objects, features and advantages of the invention will be apparent from the following more particular description of the embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Definitions

A "repellent" as used herein is any composition or formulation that makes unattractive to pests a habitat, food source or other site ordinarily sought or frequented. The term "pest" is intended to include living organisms that occur where they are not wanted or that cause damage to crops or food or turf or humans or other animals. Examples of pests include insects, mice and other animals, unwanted plants (weeds), fungi, microorganisms such as bacteria and viruses, and prions.

An "attractant" as used herein is any composition or formulation that makes attractive to pests a habitat, food source or other site which may be frequented or traversed by the pests.

"Alter the movement" as used herein refers to the ability of a formulation to change the mobility or direction of a pest (an animal and/or insect). For example, a repellent formulation applied to a surface may "alter the movement" of such insects by making a region of application near the surface unattractive to the insects and prevent the insects from approaching the surface.

Further, as used throughout the specification the term "about" is defined as plus or minus 10% of the stated value.

As used herein, the term "bait" as it relates to pest is any substance or composition in any form which lures or entices, whether chemically or physically (such as a visual cue), a pest. Baits include, but are not limited to, those made by Raid, Terro, Combat, Jensen, Hot Shot, Woodstream, SC Johnson, Advance, MaxForce, or any commercially available bait or combination thereof and the like. A "bait" may also be an attractant.

As used herein, a "trap" or "bait box" means any container or structure which may contain a bait, attractant or repellent and which is capable of containing one or more pests.

Units of measure used herein embrace both standard units and metric units. It is to be understood that where repellent or attractant compositions are measured, formulated or packaged as liquids, the units may be in increments of ounces, cups, pints, quarts, gallons, barrels, or portions thereof. They may also be in increments of milliliters, cubic centimeters, deciliters, liters, cubic meter or portions thereof.

It is to be understood that where repellent or attractant compositions are measured, formulated or packaged as solids, the units may be in increments of ounces, pounds, tons, or portions thereof. They may also be in increments of milligrams, grams, kilograms, metric tons or portions thereof.

Coverage, as it relates to the effective repellent or attractant radius of the devices of the invention, may be expressed in inches, feet, square feet, yards, square yards, acres, square acres, or portions thereof. They may also be in increments of millimeters, square millimeters, centimeters, square centimeters, meters, square meters, hectares, kilometers, square kilometers or portions thereof. Conversion between the standard and metric systems is readily understood in the art and particularly by those of skill in the art.

Pest Management System Devices

The present invention provides for a pest control management system or "pest management system" or "PMS" which are functional to control pest populations either by preventing ingress or egress or by attracting pests for containment and/or relocation as well as for extermination. In this system, a repellent (or attractant) formulation is incorporated into, used with a device which resembles, is disguised as, or is already an integral part of its environment.

The present invention provides for pest management systems which may incorporate repellent and/or attractant compositions or formulations. They may also incorporate commercial or non-commercial baits, abatement systems, traps or bait boxes. The advantages of such a disguised trapping system include ease of use and a more acceptable presence. As such, they would be superior to unattractive traps and consequently be used more often which would, by definition, result in more trapped pests.

In one embodiment, the pest management system comprises is fabricated in the shape of a planter saucer. The PMS saucer embodiment of the invention is further illustrated in FIGS. 1-12.

Figure 1:
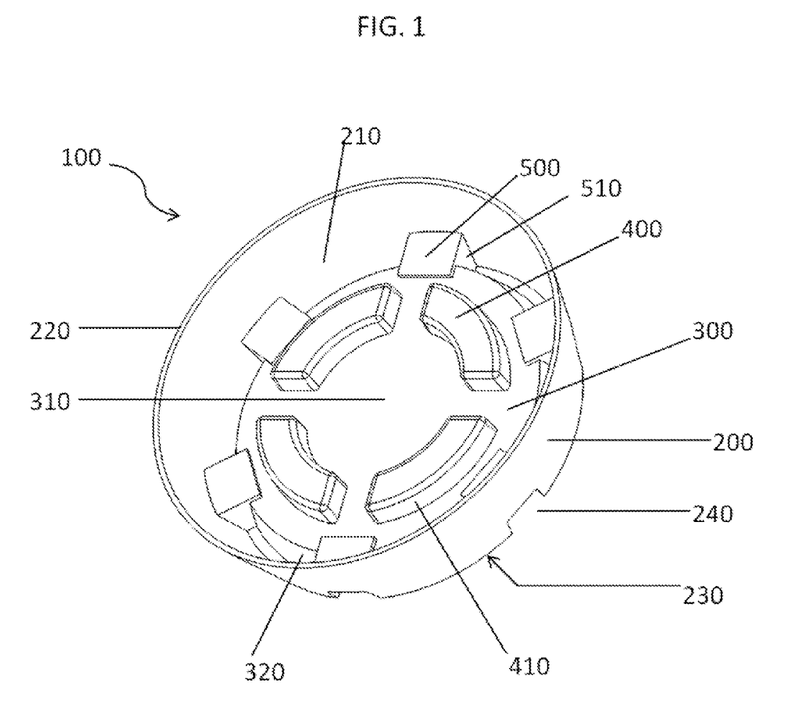
FIG. 1 is a top view line drawing of one embodiment of the PMS saucer device 100 of the invention.
Figure 2:
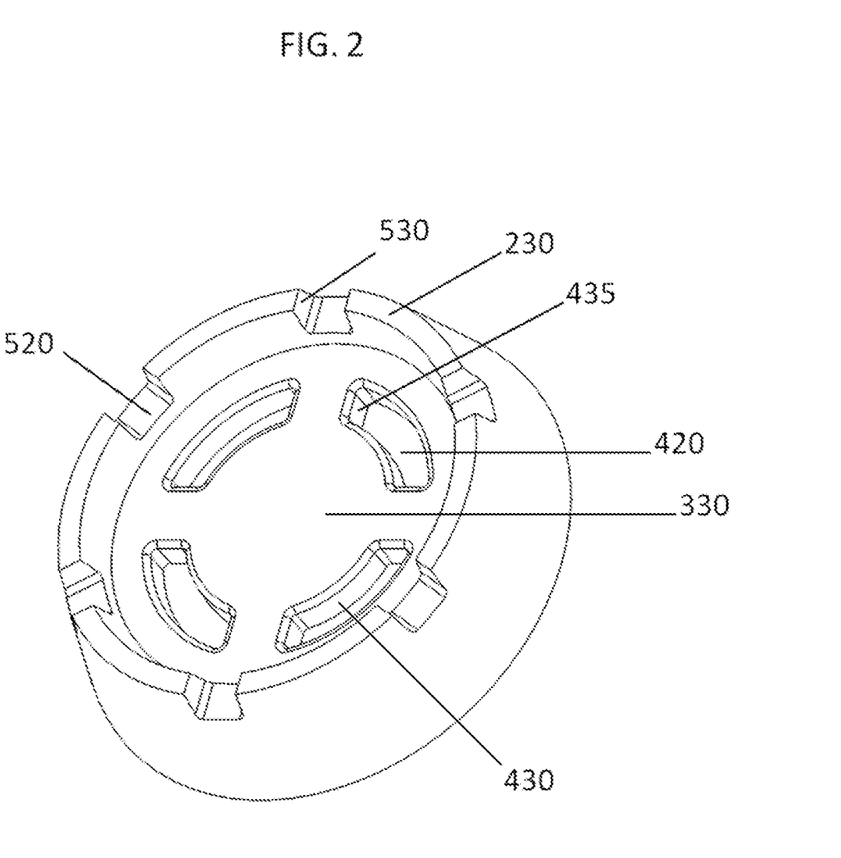
FIG. 2 is a bottom view line drawing of one embodiment of the PMS saucer device 100 of the invention.

FIGS. 1 and 2 illustrate a top and bottom view, respectively, of one embodiment of the pest management saucer device 100 of the invention. The saucer device 100 comprises an outer sidewall 200 which, as shown, is outwardly tapered; an interior platform 300 connected to the outer sidewall 200 at least through its lower edge and which is, as shown, inwardly tapered; one or more internal risers 400 positioned on the surface of the interior platform 300; and at least one port 240 extending through the outer sidewall 200 to a cavity within the device 100.

The saucer device of the present invention may be manufactured as a single part or as multiple parts and joined by any means known in the art. Modular or replacement aspects of the device may include the ribs, risers, and/or port frames. If manufactured as a single part, the saucer device may be molded from any material amenable to the molding process, including but not limited to plastics, polymers, composites, resins, fibers, elastomers and the like. Molding may be by injection molding, blow molding, thermoforming, transfer molding, reaction injection molding, compression molding, extrusion, and the like. When manufactured as a modular system the parts may be made from different materials or from the same materials.

The outer sidewall 200 is comprised of an outer and inner surface 210, an upper rim 220 and lower rim 230. The lower rim 230 juxtaposed between any two ports 240 will form a base or foot of the device. There may be incorporated into the sidewall, a gate or door capable of opening and which is larger than the ports (not shown). Said gate or door would allow access to the cavity and may be removable or hinged my any means known in the art. The diameter of the device as measured between the interior edges of the base or foot of the device may be between 2-4 inches, 2, inches, 3 inches, 4 inches, 5 inches, 6 inches, between 5-10 inches, between 2-12 inches, between 1-12 inches, 12, inches, between 2-24 inches, or any unit measurement of at least ¼ inch described within these ranges. The diameter of the device as measured between the upper edges of the outer sidewall of the device may be between 2-4 inches, 2, inches, 3 inches, 4 inches, 5 inches, 6 inches, between 5-10 inches, between 2-12 inches, between 1-12 inches, 12, inches, between 2-24 inches, or any unit measurement of at least ¼ inch described within these ranges.

The embodiment shown in FIGS. 1 and 2 is of a vertically outward tapered frusto-conical shape but may be of any shape including, but not limited to, conical, cylindrical, square, triangular, hexagonal, rectangular, irregular and the like. The surfaces of the outer sidewall or any of the exterior surfaces may be smooth or may be textured. Textured surfaces may be preferable for improved gripping. Overall dimensions of the outer sidewall and the device in total may vary.

The interior platform 300 is comprised of an interior top surface whose central portion 310 may be altered, a sidewall 320 which may be continuous if the interior platform is circular in nature, and a bottom surface 330. The interior platform provides a surface for the positioning of risers as well as for an additional raised central platform.

The internal risers 400 are comprised of a roof, one or more outer surfaces 410 and 415 (terminal outer surface), a ceiling 420, one or more internal surfaces 430 and 435 (terminal inner surface). There may be one or more internal risers positioned on the surface of the interior platform. Risers may comprise one continuous circular riser, a series of semi-circular rises (as shown in FIG. 1), one square riser or a series of edged rises having a single rectangular shape or a combination of shapes. Internal risers may extend above the central platform in height, be the same height or be shorter than the central platform. They may have substantially flat surfaces or roofs or the roof may be textured or grooved. Grooved risers have the advantage of channeling fluids which may drain from a pot to the lower level or base of the saucer device. While not shown in the Figures, optional drainage holes may be incorporated into the design.

Figure 3:
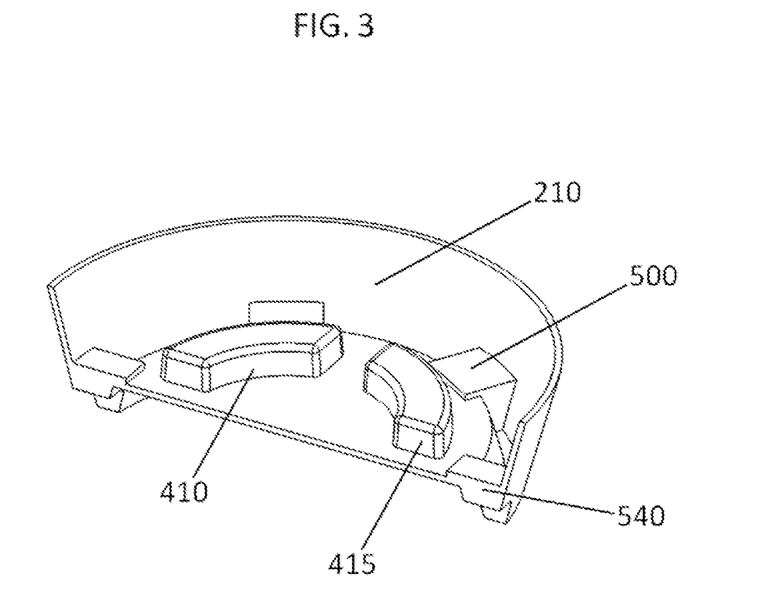
FIG. 3 is a side cut away view line drawing of one embodiment of the PMS saucer device 100 of the invention.

The ports 240 which represent a passage from the outer sidewall 200 are comprised of a port roof 500, a port body 540, exterior port walls 510, a port ceiling 520 and interior port walls 530. FIG. 3 illustrates a cutaway view where the port body 540 is shown as well as a cross section of the interior platform. Ports are necessary for the ingress and/or egress of pests. To this end, the ports may be of any size which accommodates the pest of interest and the opening may extend from 1-80 percent of the height of the outer sidewall of the device. They may also be of any shape including, square, triangular, trapezoidal, rectangular, circular, and the like, or combinations thereof. There may be one or more ports along the base of the outer sidewall 200 of the device. Ports may be closed at the base or open. Open ports are shown in FIGS. 1-12.

Figure 4:
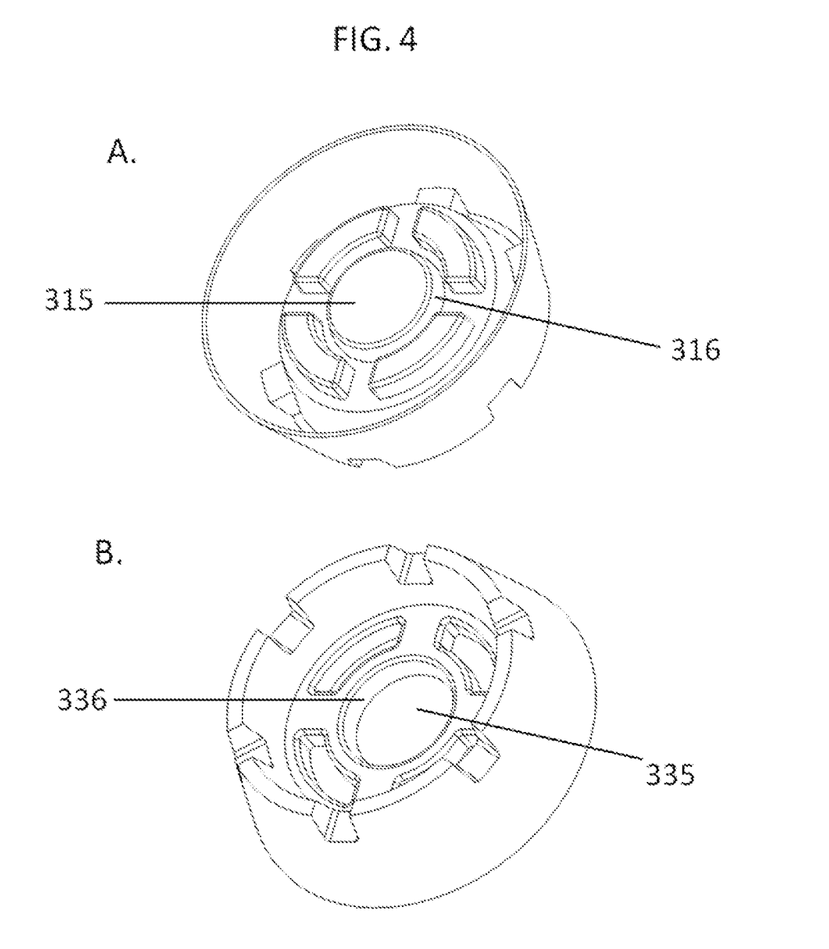
FIG. 4 is a top (4A) and bottom (4B) view drawing of one embodiment of the PMS saucer device 100 of the invention showing the central platform 315 and its outer wall 316 as well as the central platform ceiling 335 and its internal wall 336.

If the central portion of the interior platform 310 is raised, a central platform is formed. This platform is shown in FIG. 4 and comprises a central platform roof 315 and outer wall 316 as well as a ceiling 335 and inner wall 336. Incorporation of a central platform affords a larger overall cavity for placement of repellents or attractants. The central platform, by definition will be smaller in diameter than the overall interior platform. In one embodiment the ratio of the radius of the top surface of the central platform (CPr; Central Platform radius) to the radius of the interior platform (IPr; Interior Platform radius) or (CPr/IPr) is between 0.2 and 0.9.

Figure 5:
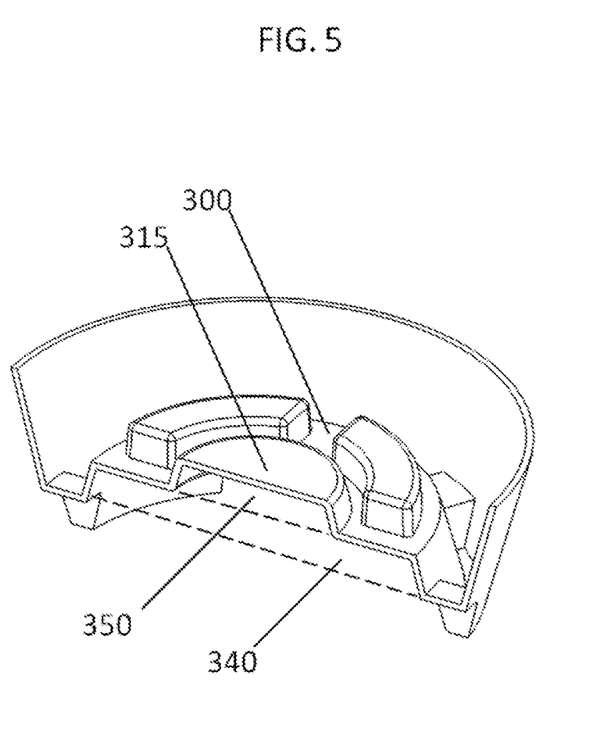
FIG. 5 is a side cut away view line drawing of one embodiment of the PMS saucer device 100 of the invention showing the central platform cavity 350 and the interior platform cavity 340.

FIG. 5 shows a cutaway view of the saucer device and provides a view of the cavities, 340 and 350, which are present beneath the interior platform 300 and the central platform 315, respectively. These cavities may be separated by a physical barrier or be continuous to form a "tiered" looking cavity viewed in cross section. As used herein, a "cavity" is any chamber or section of a larger system.

Figure 6:
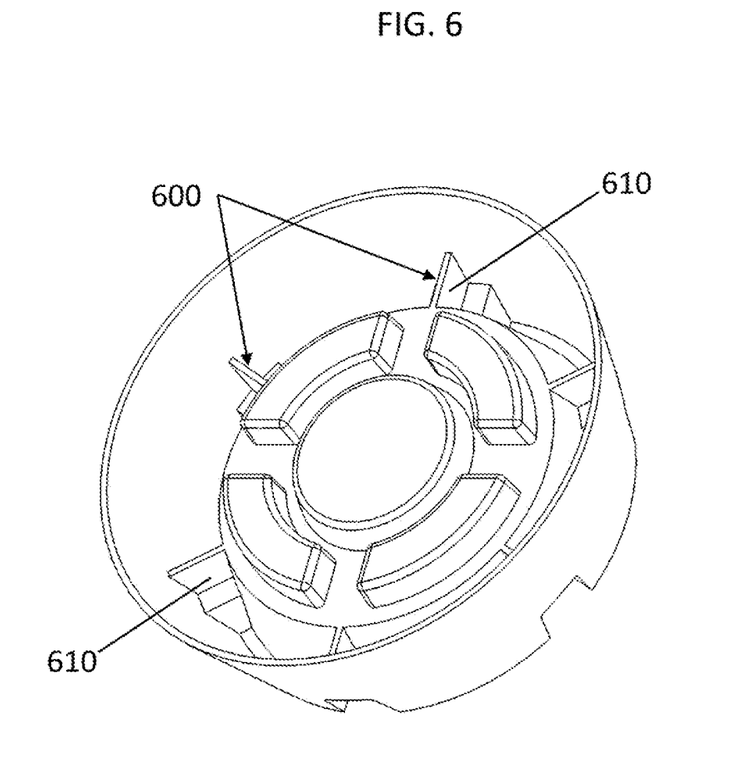
FIG. 6 is a top view line drawing of one embodiment of the PMS saucer device 100 of the invention illustrating the optional ribs 600 and their surfaces 610.

The saucer device of the present invention may be manufactured with additional supporting structures. Such structures include, but are not limited to ribs 600. Ribs are shown in FIG. 6 and comprise a body and various surfaces 610.

Figure 7:
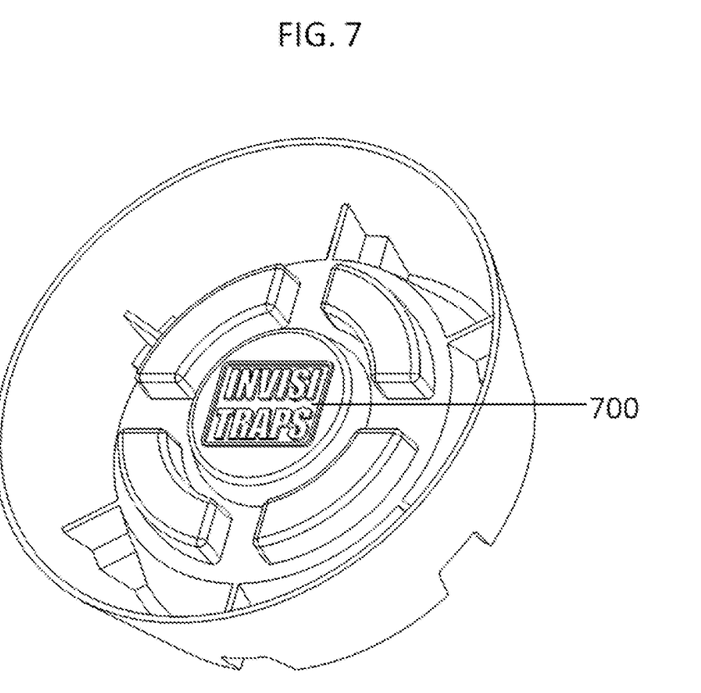
FIG. 7 is a top view line drawing of one embodiment of the PMS saucer device 100 of the invention illustrating an optional marking 700 which may comprise branding. Here the Invisitraps™ (Trademark Application Ser. No. 77/908,044) name is shown.

The saucer device of the present invention may also be manufactured with one or more surfaces for individual marking or branding. Such a branding example is shown in FIG. 7 where the trade name Invisitraps™ 700 has been molded into the device.

Figure 8:
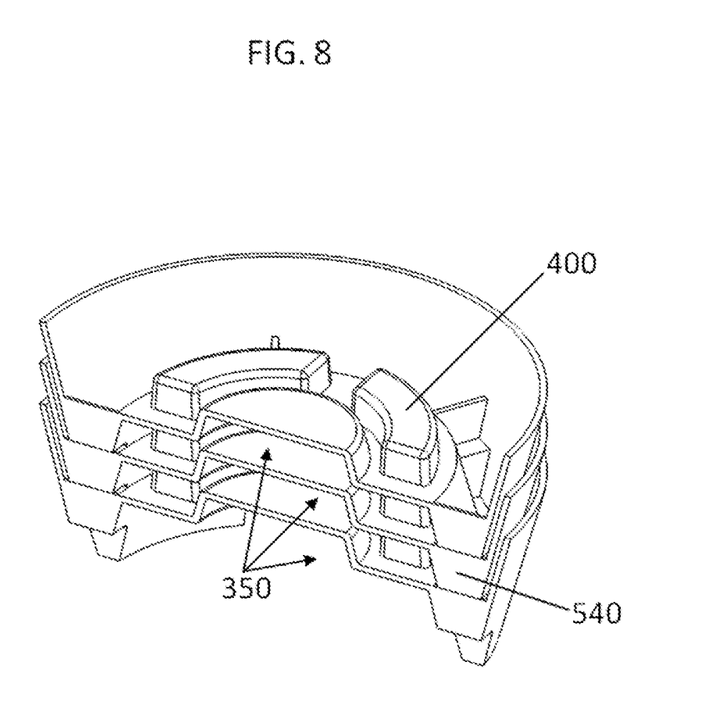
FIG. 8 is a side cut away view line drawing of one embodiment of the PMS saucer device 100 of the invention showing the stacking capability of the system. Stacking may occur between devices where a lower surface of the device rests on the roof of the port body 540 or where the top surface of the internal riser 400 support the device above it. The central platform cavity 350 can be seen also.

Additionally, the saucer device of the present invention has been designed to maximize portability and stackability. FIG. 8 demonstrates the stacking features of the saucer device. Here, it can be seen that various parts of the device are manufactured in such a way as to "marry to" or "seat" onto the same surface of a stacked neighbor. The port body 540 can act as a support at its surface and as a foot at its base to afford optimal stacking in minimal space.

In another embodiment, the interior platform 300 may be a flat surface having no associated risers or central platform. The elevation of this surface, while never higher than the outer sidewall 200, may be of any height which allows the placement of one or more baits, traps, attractants or repellents in the cavity 340 of the device. This embodiment is shown in detail in FIGS. 9-12. In one embodiment the ratio of the radius of the top surface of the interior platform (IPr; Interior Platform radius) to the radius of a circle coincident with the upper edge of the outer sidewall (OSr: Outer sidewall radius) or (IPr/OSr) is between 0.2 and 0.9.

Figure 11:
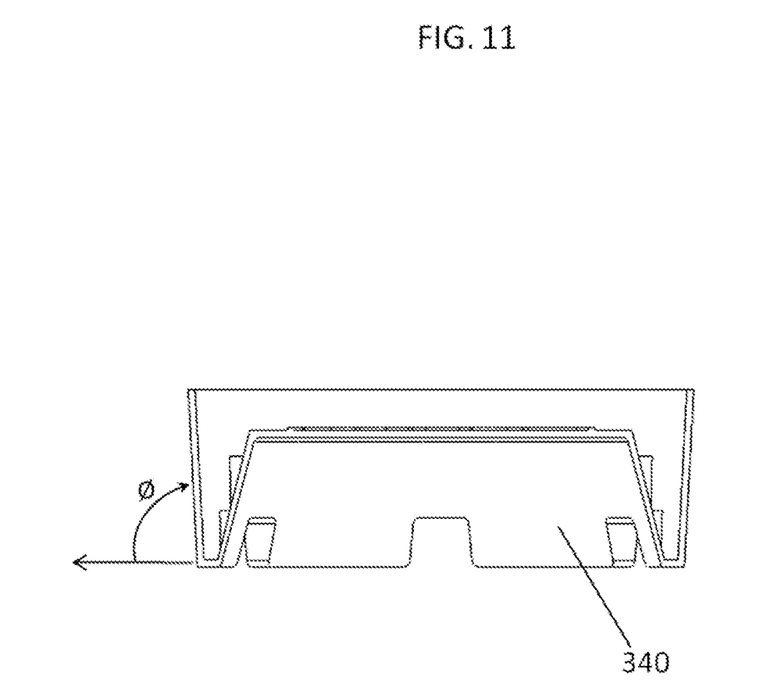
FIG. 11 is a side cut away view (of the embodiment in FIGS. 9 and 10) line drawing of one embodiment of the PMS saucer device 100 of the invention. Also shown is the outer sidewall profile angle, ø.
Figure 12:
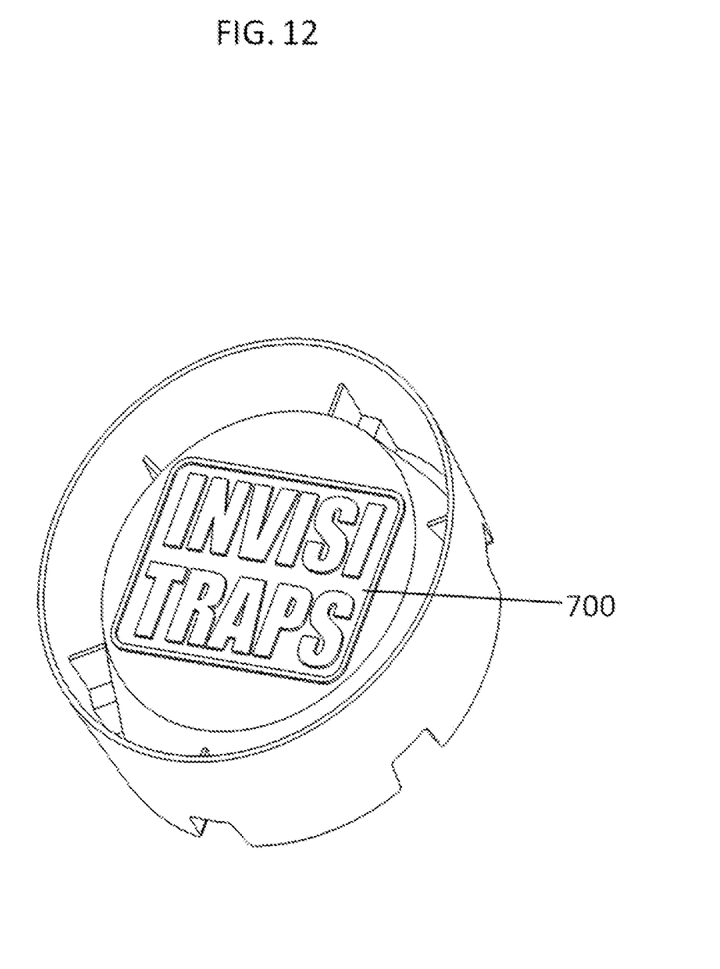
FIG. 12 is a top view (of the embodiment of FIG. 9) line drawing of one embodiment of the PMS saucer device 100 of the invention illustrating an optional marking 700 which may comprise branding. Here the Invisitraps™ (Trademark Application Ser. No. 77/908,044) name is shown.

The angle of the outer sidewall, ø, shown in FIG. 11 relative to a horizontal surface may be any angle between 45 degrees and 135 degrees. The angle may be approximately 90 degrees which includes angles of 85-92 degrees. This angle may result in the outer sidewall and the interior platform sidewall becoming coincident. The vertical height of the device 100 of the invention may vary depending on the size of the bait to be used in the cavity or on the size of the planter or pot to be disposed on the top. In one embodiment, the height may range from 4-6 inches, 4-8 inches, 4-12 inches, or it may be 1-3 inches, 2 inches, 3 inches, 4 inches, 5 inches, 6 inches, 7 inches, 8 inches, 9 inches, 10 inches, 11 inches, 12 inches or larger or any unit measurement of at least ¼ inch described within these ranges.

In one embodiment, the systems of the invention may be an object that is configured to resemble and/or disguised as an item that blends and/or integrates into its environment. As used herein, "configured to resemble" and "disguised as" refers to an object that is made to appear as, is similar to, takes on a false appearance of, is camouflaged as, and the like, that may occur in the environment in which the object is placed. As used herein, "blends" and "integrates into" refers to the ability of an object to appear natural or normal or native, incorporate, merge, mingle, assimilate, combine, coordinate, unite, and the like, with its environment.

Devices and means for application of the formulations as pest management systems include, but are not limited to, plant pots, plant pot saucers, vases, door jams, buckets, cans, pans, glass bottles, plastic bottles, used household container items, food container, any empty container, food items, articles of clothing such as socks, stockings, and the like, cardboard or degradable boxes, paper, newspaper, books, deck of cards, logs, rocks, outdoor equipment such as tents, tent stakes and the like.

A further embodiment is a pest management system which includes a signal to alert that a pest has been captured in or come close to the device. "Signal" as used herein refers to a sign, indication, indicator, gesture or object that conveys a notice to a person. A "signal" can include, but is not limited to, a flag, sound, smell (odor), motion, blinking light and the like. For example, a device may be a container configured to resemble a log with a compartment inside the log housing an attractant formulation and an opening to allow a pest to enter the device. Once a pest enters the device, the pest triggers a mechanism that closes the opening and the same or another mechanism causes a signal, such as a flag, to rise out of the device.

The devices of the present invention may be used in many settings including on sidewalks, paths, trails, eves, in doorways, or any openings or opening covers which afford entry or exit of pests. To be clear, the device may be used to deter entry as well as deter exit from a particular area, space, surface or substrate.

The size of the area being treated, or coverage limits of the device, is somewhat determined by the natural roaming habitat of the animal and/or insect. Certain repellent compositions have use in large areas of several hundred acres or more, such as, but not limited to, wildlife areas or preserves, farms, nurseries, vineyards and forests. They may also be used in smaller areas such as playgrounds, backyards, athletic fields, gardens, homes, patios, greenhouses, small green spaces inside and outside cities, or in any place where it is desirable to control pests.

In some embodiments the repellent compositions or formulations used in the devices are liquids. In some embodiments they are a solid, having first been applied to a substrate or particulate. In one embodiment, the repellent composition is used to coat or treat a particulate and then allowed to dry on the particulate (with evaporation of the solvent). In other embodiments, the repellent compositions are concentrates and are mixed with particulate matter. Biodegradable and/or biofriendly substrates are advantageous where the repellent will be used in larger spaces or in close proximity to humans.

The devices of the present invention may be manufactured of fluorescent materials, have fluorescent properties or fluorescent materials applied, or have light emitting properties, whether natural or electronically derived. This combination provides a unique advantage when it is necessary to identify the location or determine where applications have occurred. It also serves to reduce waste.

Repellents and Attractants

The pest management systems of the present invention may be used in combination with the repellents or with attractants known in the art. Attractant formulations of the present invention may comprise of one or a combination of the following natural substances: sugar, honey, molasses, pheromones, plant oils, plant extracts, floral odors, proteins, salt, animal oils such as fish oil and the like, seeds, animal feed, livestock feed, and sticky agents, adhesives including substances such as tanglewood and the like. They may also include commercial pest attractants including poisons. Attractants include compositions and formulations such as those known to those skilled in the art and also disclosed in U.S. Patent Publication Nos. 20100074860 and 20090258950, the contents of which are incorporated herein by references in their entirety.

Repellent formulations of the present invention may comprise any pest repellents known in the art including those disclosed in the commonly owned application PCT/US2011/031901 or those described in PCT/US2008/072993, both of which are incorporated herein by reference in their entirety.

Both repellent and attractant composition may be applied to or installed in the devices in the form of aerosol, balm, cream, gel, lotion, mousse, patch, pump spray, roll on, solution, gel stick, solid stick, towelette, salve, ointment, powder, liquid, granules, candle, vapor, beads and the like. As used herein, "towelette" means a moistened piece of paper or cloth or the like. It is known to those in the art that "towelette" can also be known as a "wet wipe." A "patch", as used herein, means at least one piece of material which may be affixed to a surface such as skin, fabric, shoes or the like.

The following examples are given for purposes of illustration and not by way of limitation. Unless otherwise defined, all technical and scientific terms used herein have the same meaning as commonly understood by one of ordinary skill in the art to which this invention belongs. Although methods and materials similar or equivalent to those described herein can be used in the practice or testing of methods featured in the invention, suitable methods and materials are described below. The present invention is illustrated further by the following non-limiting Examples.

EXAMPLES

Example 1

Selection of Attractant

In an effort to determine whether the invisible trap of the present invention would function to attract a pest (here, ants), a variety of baits were first tested to identify a control bait which would best attract ants. Three different types of ant baits were purchased at a local hardware store. These included (1) AMDRO—Ant Killing Bait, (2) HOT SHOT—MaxAttrax Ant Bait and (3) HOT SHOT—Ultra Liquid Ant Bait. Each was placed on an identified ant trail in a residential setting. Bait #3 performed the best, attracting the ants from the trail. The other two baits did not attract any ants therefore served as negative controls.

Example 2

INVISI-Trapping of Ants

Using the device of the present invention having a raised central platform, ants are trapped by placing a bait substance such as HOT SHOT-Ultra Liquid Ant Bait beneath the device.

Example 3

INVISI-Trapping of Ants-Use of Bait Station

Figure 9:
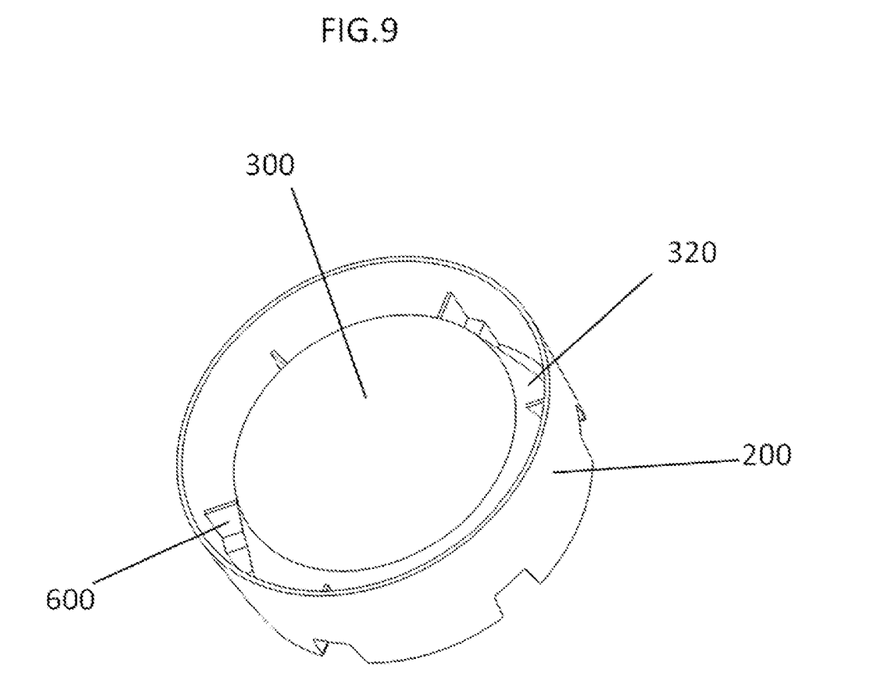
FIG. 9 is a top view line drawing of one embodiment of the PMS saucer device 100 of the invention.
Figure 10:
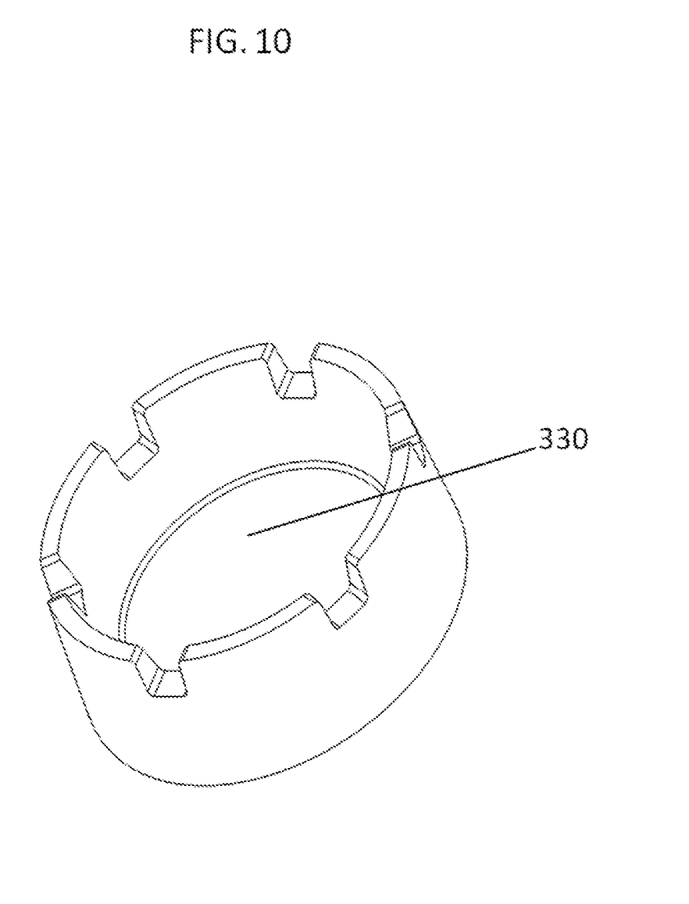
FIG. 10 is a bottom view (of the embodiment of FIG. 9) line drawing of one embodiment of the PMS saucer device 100 of the invention.

Using the device of the present invention having an interior platform as shown in FIG. 9, ants are trapped by placing a bait station such as Terro Outdoor Liquid Ant Bait Station (Senoret Chemical Co, St. Louis Mo.) or those as described in U.S. Pat. No. 7,204,054 (the contents of which are incorporated herein by reference in their entirety) beneath the device.

It is to be understood that the words which have been used are words of description rather than limitation, and that changes may be made within the purview of the appended claims without departing from the true scope and spirit of the invention in its broader aspects.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

All publications, patent applications, patents, and other references mentioned herein are incorporated by reference in their entirety. In case of conflict, the present specification, including definitions, will control. In addition, section headings, the materials, methods, and examples are illustrative only and not intended to be limiting.

The invention claimed is:

1. A pest management device comprising:
   (a) an outer sidewall having an angle relative to a horizontal surface of between 45- 135 degrees;
   (b) a radial interior platform connected to the outer sidewall at least through its lower edge and which is vertically inwardly tapered;
   (c) at least one port extending through the outer sidewall to a cavity beneath the radial interior platform;
   (d) one or more supporting ribs, wherein each of said one or more supporting ribs extends from a first end thereof at said outer sidewall to a second end thereof at said radial interior platform;
   (e) a radial central platform elevated about a center of the radial interior platform; and
   (f) one or more internal risers, wherein said one or more internal risers are arcuate and positioned radially around a perimeter of the radial central platform.

2. The device of claim 1 wherein the radial central platform is inwardly tapered from a base thereof to a top surface thereof.

3. The device of claim 2, wherein a ratio of a radius of the top surface of the radial central platform to a radius of the radial interior platform ($CP_r/IP_r$) is between 0.2 and 0.9.

4. The device of claim 3, wherein the one or more internal risers are of equal height and are each taller than the radial central platform.

5. The device of claim 1 wherein the outer sidewall has an angle of approximately 90 degrees.

6. The device of claim 5, wherein said device has a radial base, said radial base having a diameter of approximately 4 inches.

* * * * *